US009753506B2

(12) United States Patent
Saroor et al.

(10) Patent No.: US 9,753,506 B2
(45) Date of Patent: Sep. 5, 2017

(54) ELECTRONIC DEVICES WITH MULTI-LAYER HEAT REDUCTION COMPONENTS

(71) Applicant: HEWLETT-PACKARD DEVELOPMENT COMPANY, L.P., Houston, TX (US)

(72) Inventors: Shaheen Saroor, Houston, TX (US); Robert C. Brooks, Houston, TX (US); Kent E. Biggs, Tomball, TX (US); Robin T. Castell, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 22 days.

(21) Appl. No.: 14/622,433

(22) Filed: Feb. 13, 2015

(65) Prior Publication Data

US 2016/0239056 A1 Aug. 18, 2016

(51) Int. Cl.
*G06F 1/20* (2006.01)
*G06F 1/16* (2006.01)

(52) U.S. Cl.
CPC ............ *G06F 1/203* (2013.01); *G06F 1/1632* (2013.01)

(58) Field of Classification Search
CPC .................................................. G06F 1/1632
USPC ................... 361/688, 679.46, 679.47
See application file for complete search history.

(56) References Cited

U.S. PATENT DOCUMENTS

| 6,415,612 | B1 * | 7/2002 | Pokharna | F25B 21/02 165/80.2 |
| 6,434,001 | B1 | 8/2002 | Bhatia | |
| 6,453,378 | B1 * | 9/2002 | Olson | G06F 1/1632 361/679.41 |
| 6,674,642 | B1 | 1/2004 | Chu et al. | |
| 6,691,197 | B2 | 2/2004 | Olson et al. | |
| 6,966,358 | B2 | 11/2005 | Rapaich | |
| 7,542,292 | B2 | 6/2009 | Stefanoski et al. | |
| 7,684,185 | B2 * | 3/2010 | Farrugia | G06F 1/1632 248/918 |
| 2009/0166098 | A1 * | 7/2009 | Sunder | G06F 1/1626 178/18.04 |
| 2011/0115924 | A1 * | 5/2011 | Yu | G06F 1/1605 348/207.11 |
| 2012/0221873 | A1 * | 8/2012 | Wells | G06F 1/3206 713/322 |

(Continued)

OTHER PUBLICATIONS

"Beat the Heat in Notebooks with Software," Aavid Thermalloy, Apr. 26, 2010, pp. 1-6; http://www.digikey.com/Web%20Export/Supplier%20Content/Aavid_59/PDF/Aavid_BeatTheHeat.pdf?redirected=1.

*Primary Examiner* — Tuan T Dinh
*Assistant Examiner* — Mukund G Patel
(74) *Attorney, Agent, or Firm* — Fabian VanCott (57) ABSTRACT

In one example in accordance with the present disclosure an electronic device with a multi-layer heat reduction component is described. The device includes a number of integrated circuits and a first layer in contact with at least one of the number of integrated circuits to remove heat from at least one integrated circuit. The device also includes a second layer separated from the first layer by an air gap to reduce heat transfer between the first layer and the second layer. The second layer is retractable to expose the first layer when docked to a station. The electronic device operates in a first mode when docked to a station and a second mode when not docked to the station.

14 Claims, 7 Drawing Sheets

(56) References Cited

U.S. PATENT DOCUMENTS

| | | | | |
|---|---|---|---|---|
| 2013/0050943 A1* | 2/2013 | Diep | ................. | H05K 7/20436 |
| | | | | 361/702 |
| 2013/0301221 A1* | 11/2013 | Wu | ........................ | H01L 23/38 |
| | | | | 361/707 |
| 2014/0257591 A1* | 9/2014 | Cheng | ................. | G05D 7/0676 |
| | | | | 700/300 |

* cited by examiner

ELECTRONIC DEVICES WITH MULTI-LAYER HEAT REDUCTION COMPONENTS

BACKGROUND

Mobile device usage to carry out day-to-day tasks is on the rise in society. Users rely on mobile devices to keep in contact with friends, family, business colleagues, and other individuals. Examples of such contact include phone calls, text messages, email correspondence, real-time multimedia communication, and interaction via social media. Mobile devices may also be used to browse the internee, access remote databases, among other data processing operations carried out by a mobile device. As mobile devices continue to develop, their use in society is likely to continue to increase. Enhancing the efficiency and operation of such mobile devices may increase their effectiveness and use in daily life.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

As mentioned above, mobile technology is seeing wider application in our society. Individuals rely on mobile technology to gain instant access to a wealth of information and to maintain contact at all times. It is likely that unforeseen uses of mobile technology will develop in time. To satisfy this desire to have immediate access to electronic information and electronic contact, there is an ever increasing demand to increase mobile performance. In fact, it is likely that with time many presently unknown uses for mobile technology will be discovered. There is also an increased demand for more efficient and user-friendly mobile-devices. For example, users want devices that are comfortable, aesthetically pleasing, and in particular, smaller. In other words, there is a technological demand for smaller devices that are capable of higher performance, such as the performance of a desktop personal computer. However, advancements in delivering such an efficient, comfortable, and powerful mobile device are precluded by certain limiting factors.

For example, a byproduct of processor use is heat. As processing use of mobile devices is increased, so increases the heat generated by the mobile device. This generated heat may be uncomfortable to a user, and in some cases may be dangerous as injuries from heat exposure, such as burns, may result. Moreover, the heat generated by processing components of the mobile device may cause the processors or other components to be damaged due to extended exposure to such heat. Heat generation therefore is a significant impediment to the continued expansion of mobile technology; this is even more evident as mobile devices continue to reduce in size. To reduce such heat generation, some devices implement low power processors; however low power processors may not meet the demand of expanded mobile device use and may be rendered even more insufficient given the likely increase in mobile device usage.

The device and system of the present specification and appended claims address this and other issues. Specifically, a multi-layered system is described that increases heat dissipation throughout the electronic device. Specifically, a multi-layer heat reduction component is included in an electronic device. For example, an inner layer may be coupled to the heat generating components of the electronic device such as a central processing unit (CPU), a platform controller hub (PCH), and a discrete graphics processing unit (dGPU) among other integrated circuits and heat generating components. This inner layer acts as a heat sink to the heat generating components. An outer layer of the multi-layer design may be separated from the inner layer by an air gap. The outer layer may be a portion of the outer cover of the electronic device, in other words, a portion that comes in contact with a user's skin. The air gap between the layers reduces the heat transfer from the hot inner layer to the outer layer.

The device may operate in two modes, the first mode being a mobile mode when the device is not docked to a station, such as when the mobile device is in use, or in a user's bag. In this mode, the cooling multi-layer design reduces the heat transfer and makes the electronic device cooler and safe for user interaction. In this mode, the electronic device may operate at a lower power mode such that less heat is generated by the processing components.

In a second mode, the electronic device may be docked to a charging station or a display panel. When docked in the station or display panel, the electronic device may operate at a higher level, i.e., more processing power, which generates more heat. To keep the electronic device cool in the face of the increased processing power, the docking station or display panel may include an active cooling system. The cooling system may include liquid cooling coils that circulate liquid coolant, a fan to circulate air, or combinations thereof. When docked, the outer layer of the electronic device may be retracted such that the cooling system of the docking station is adjacent to the hot inner layer. In this fashion, the coding system of the docking station more effectively removes heat from the electronic device and thereby allows the electronic device to operate at higher processing and performance levels.

Certain examples of the present disclosure are directed to a multi-layer heat reducing electronic device that provides a number of advantages not previously offered including improved heat reduction and increased processing capabilities of mobile technology. However, it is contemplated that the systems and devices disclosed herein may prove useful in addressing other deficiencies in a number of technical areas. Therefore the systems and devices disclosed herein should not be construed as addressing just the particular elements or deficiencies discussed herein.

The present specification describes an electronic device with a multi-layer heat reduction component. The electronic device includes a number of integrated circuits and a first layer in contact with at least one of the number of integrated circuits to remove heat from at least one integrated circuit. The device also includes a second layer separated from the first layer by an air gap to reduce heat transfer between the first layer and the second layer. The second layer is retractable to expose the first layer when docked to a station. The electronic device operates in a first mode when docked to a station and a second mode when not docked to the station.

A system for powering an electronic device with a multi-layer heat reduction component is described. The system includes an electronic device that includes a number of integrated circuits and a multi-layer heat reduction component. The multi-layer heat reduction component includes a retractable outer layer to, when docked, expose an inner layer to a cooling system of a docking station, for example. The retractable outer layer is separated from the inner layer by an air gap. The system also includes a docking station to, when selectively coupled to the electronic device, allow the electronic device to operate in a high power mode and cool the electronic device via a cooling system of the docking station. When not docked, the electronic device operates in a low power mode.

An electronic device with a multi-layer heat reduction component is described. The electronic device includes a number of integrated circuits and a multi-layer heat reduction component. The multi-layer heat reduction component includes a first layer coupled to at least one of the number of integrated circuits to remove heat from the at least one integrated circuit and a second layer separated from the first layer by an air gap to reduce a thermal output of the electronic device. The electronic device operates in at least a higher power docked mode and lower power mobile mode. The system also includes a sensor system to indicate when the electronic device is in an enclosed environment and to place an electronic device in an enclosed environment in a standby mode until an output of the sensor system is de-asserted.

The systems and devices described herein may allow for increased performance of mobile devices by supplying more power and also by incorporating a multi-layer heat reduction component when in a mobile mode. Moreover, the multi-layer heat reduction component also increases the safety and comfort of the electronic device as the undesirable consequences of increased processing usage is reduced by the air gap between the multiple layers.

As used in the present specification and in the appended claims, the term "thermal design power" is meant to refer broadly to a measure of processing power. For example, the thermal design power (TDP) may be a maximum amount of heat, measured in watts that a processor can generate and be safely dissipated by the system. Accordingly, higher TDP processors may have better performance and may offer more processing power as the system is capable of dissipating more heat.

Still further, as used in the present specification and in the appended claims, the term "a number of" or similar language may include any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language indicates that a particular feature, structure, or characteristic described is included in at least that one example, but not necessarily in other examples.

Figure 1:
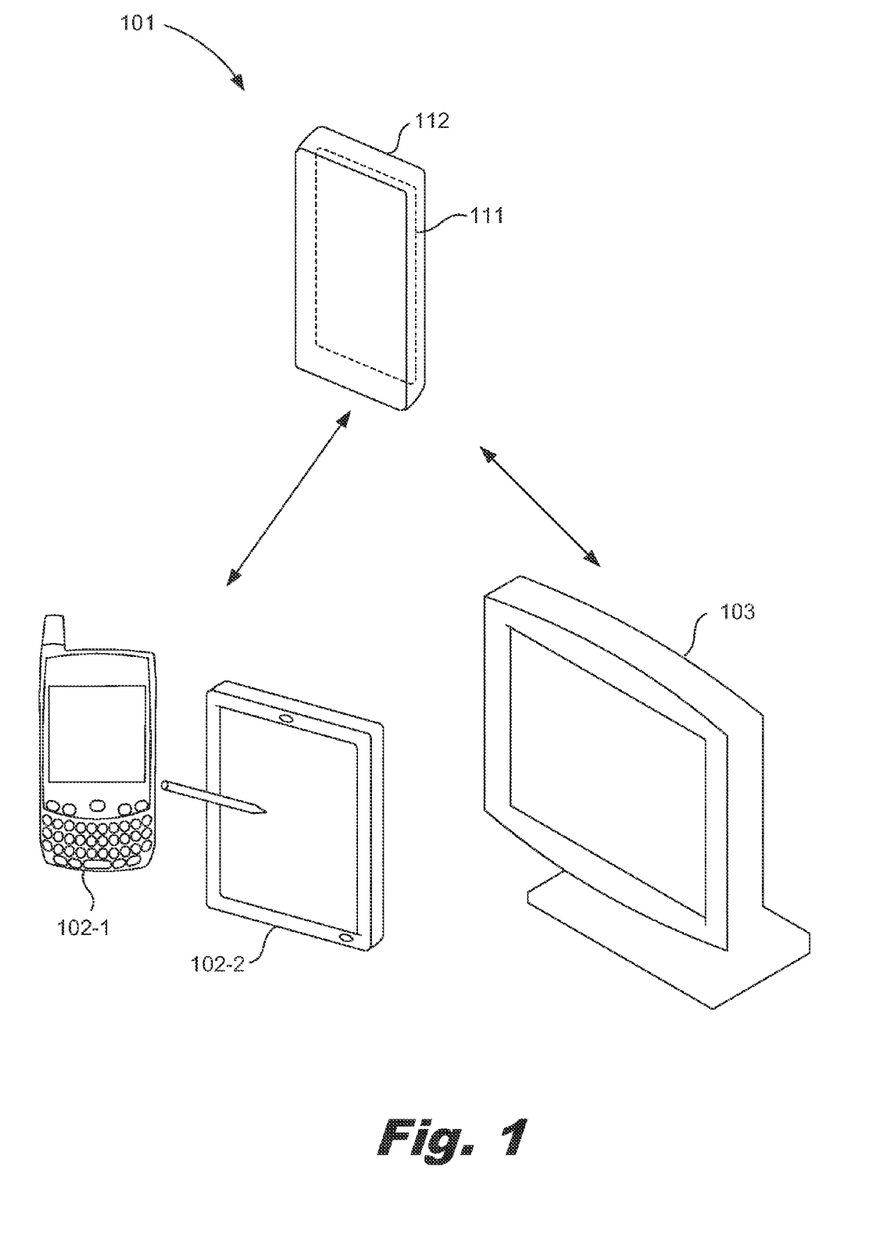
FIG. 1 is a diagram of an electronic device with a multi-layer heat reduction component, according to one example of the principles described herein.

FIG. 1 is a diagram of an electronic device (101) with a multi-layer heat reduction component, according to one example of the principles described herein. In some examples, the electronic device (101) may be any device which is capable of executing data processing operations. For example, the electronic device (101) may be a stand-alone personal computing device. The stand-alone personal computing device may be coupled to a number of mobile devices (102) to provide processing power to those mobile devices. The electronic device (101) may include an external processor which may supply processing power to another device such as a mobile device (102) or a second electronic device (103). In some examples, the electronic device (101) may include a 35 watt (W) TDP processor. In other words, the processor of the electronic device (101) may provide processing power to the mobile device (102) similar to the processing power found in a desktop personal computer. The electronic device (101) may include a multi-layer heat reduction component to dissipate the heat generated by the processor of the electronic device (101). Specifically, the electronic device (101) may include an inner layer (111) that acts as a heat sink to internal integrated circuits. The inner layer (111) is indicated with dashed lines to indicate that it is internal to the electronic device (101).

Another component of the multi-layer heat reduction component of the electronic device (101) is an outer layer (112) that is separated from the inner layer (111) by an air gap. The air gap allows the high power processor (i.e., the 35 W TDP processor) of the electronic device (101) to provide additional processing power to a mobile device (102) because the electronic device (101) has greater capacity to dissipate heat.

The electronic device (101), when in a mobile mode may be coupled to the mobile devices (102) via wireless connection, a radio frequency (RF) connection, or a Bluetooth connection, among other types of wireless or wired connections, to provide additional processing power to the mobile device (102). For example, mobile devices (102) to satisfy consumer demand and to compensate for device limitations may have reduced processing capabilities. In this example, the electronic device (101) may be used to supplement the processing capabilities of the mobile device (102). Examples of mobile devices (102) include smart phones (102-1), tablets (102-2), personal digital assistants (PDAs), gaming devices, and mobile devices among other electronic devices. In this fashion, the electronic device (101) may allow a mobile device (102) to have similar processing capabilities as a desktop personal computer. In some examples, the electronic device (101) may be sized to be portable. For example, the electronic device (101) may be sized to be hand-held, or to be carried in a bag, such as a purse of a user. When in a mobile mode, the electronic device (101) may operate at a lower TDP as compared to when in a docked mode. For example, a portion of the performance of the 35 W processor found in the electronic device (101) may be used when in a mobile mode. In some examples, the electronic device (101) may have a screen to interface with a user. For example, the screen may allow exploration of files on the electronic device (101), as well as manipulation and update of the various applications and configuration of the electronic device (101).

While FIG. 1 depicts an electronic device (101) that is separate from the mobile device (102), the electronic device (101) that has the multi-layer heat reduction component may be in the mobile device (102). In other words, the outer layer of the mobile device (102) may be removable to expose an inner layer of the multi-layer system to expose the inner layer to a cooling system of a docking station. Further in this example, the outer cover of the mobile device (102) may be separated from the inner layer by an air gap that reduces heat transfer between the layers.

The electronic device (101) may also, in one mode, be communicatively coupled to a second electronic device (103) such as a desktop computer, an all-in-one station, or a display panel. In this example, the electronic device (101) may provide processing capabilities to the second electronic device (103) either as the main processor of the second electronic device (103) or as a supplemental processor to the second electronic device (103). For example, if the second electronic device (103) is a display panel, the electronic device (101) may be the main processor coupled to the display panel. The electronic device (101), when coupled to the second electronic device (103), for example in a dock, may provide processing power to both the mobile device (102) and the second electronic device (103). Moreover, when docked, the electronic device (101) may operate at a higher level. In other words, the electronic device (101) may operate at a higher TDP. Accordingly, the electronic device (101) may include a higher power, or higher TDP, processor, that can operate at different levels based on a mode of operation, i.e., a mobile mode or a docked mode.

Figure 2:
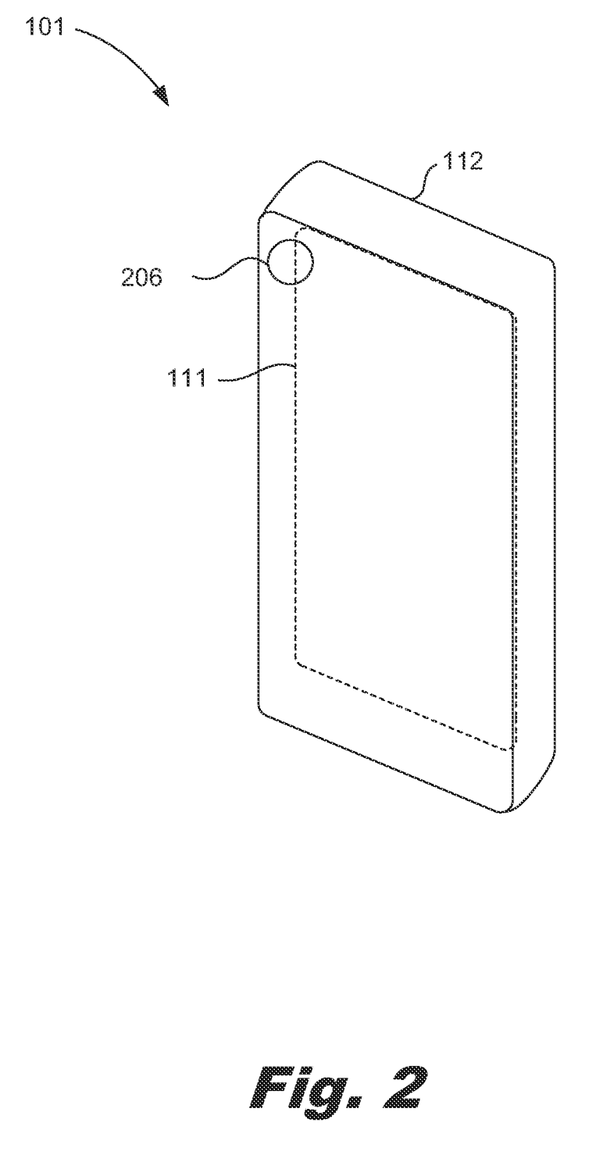
FIG. 2 is a diagram of an electronic device with a multi-layer heat reduction component and a sensor system, according to one example of the principles described herein.

FIG. 2 is a diagram of an electronic device (101) with a multi-layer heat reduction component and a sensor system (206), according to one example of the principles described herein. In some examples, the electronic device (101) may include a sensor system (206) to indicate when the electronic device (101) is in an enclosed environment. For example, in a mobile mode the electronic device (101) may be carried by a user, for example in a bag, to supplement the use of a mobile device (102). Being in an enclosed environment may exacerbate the effects of the heat output of the electronic device (101) as the generated heat has nowhere to escape. With poor ventilation, the electronic device (101) may be more susceptible to the effects of hot components. Accordingly, the sensor system (206) may indicate when the electronic device (101) is in an enclosed environment and may place the electronic device (101) in a standby mode until an output of the sensor system (206) has been de-asserted. Such de-assertion may indicate that it is "safe" for the electronic device (101) to re-enter an operating mode. For example, a de-assertion of the output may indicate that the electronic device (101) has returned to a predetermined, or safe, thermal level and has been at that safe level for a certain period of time. In some examples, the sensor system (206) may include a light sensor that detects ambient light. Accordingly, when the sensor system (206) does not detect ambient light for a predetermined period of time, the sensor system (206) may put the electronic device (101) in a standby, or lowest TDP, power mode, for example until removed from the enclosed environment, or after a set period of time. While one example of a sensor has been given, i.e., a light sensor, any other type of sensor may be used to indicate that the thermal output of the electronic device (101) is at an undesirable, unsafe, or other predetermined level.

Figure 3:
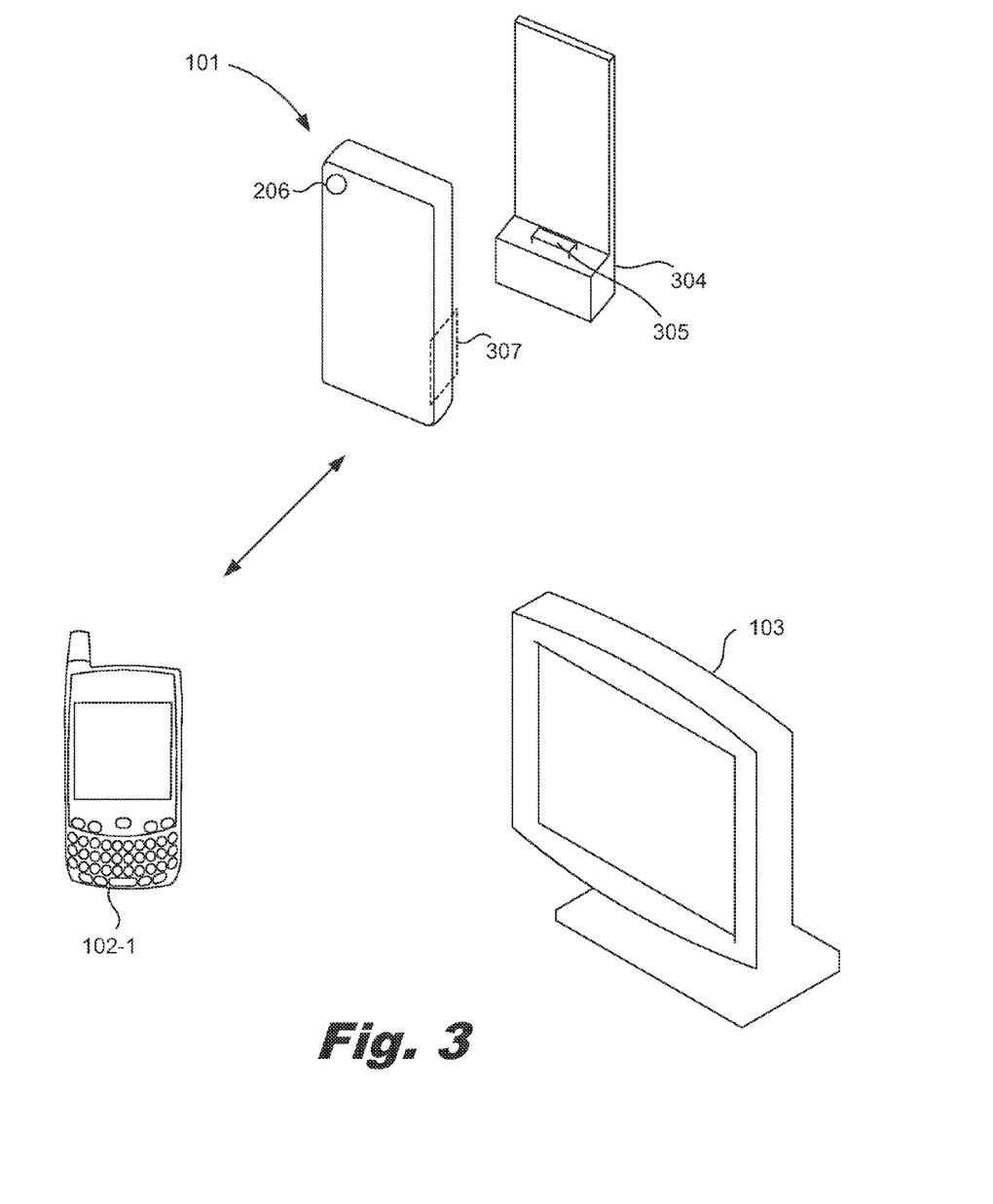
FIG. 3 is a diagram of an electronic device with a multi-layer heat reduction component in a mobile mode, according to one example of the principles described herein.

FIG. 3 is a diagram of an electronic device (101) with a multi-layer heat reduction component in a mobile mode, according to one example of the principles described herein. As described above, in some examples, the electronic device (101) may be in a low power mobile mode, for example, when powering a mobile device (102); or, as when the electronic device (101) is the mobile device (102), when in use by a user. In such a low power mode, the electronic device (101) may operate with a TDP of less than 5 watts (W). Operating at less than 5 W TDP may allow the electronic device (101) to provide a certain level of processing capability while maintaining a comfortable and safe thermal output. Moreover, operating at less than 5 W TDP may allow the electronic device (101) to operate off a battery.

The system may also include a docking station (304). The docking station (304) may allow the electronic device (101) to operate at a higher level, i.e., a higher TDP. For example the electronic device (101), when docked, may be able to operate at a higher level due to an increased cooling of the electronic device (101) via an active cooling system of the docking station (304). In other words, the cooling system of the docking station (304) may include a component to cool the heated inner layer (FIG. 1, 111) of the electronic device (101).

When selectively coupled to the docking station (304), the electronic device (101) may operate at a higher power level. In such a high power mode, the electronic device (101) may operate with a TDP of more than 35 W. In this high power mode, the electronic device (101) may supply processing power to both the mobile device (102-1) and a second electronic device (103). In this fashion, the electronic device (101) may provide full desktop computer processing power to a mobile device (102-1). While FIG. 3 depicts the docking station (304) as separate from the second electronic device (103), the docking station (304) may be integral to the second electronic device (103).

As described below, the cooling system of the docking station (304) may include liquid cooling coils that are positioned adjacent to the inner layer (FIG. 1, 111) of the electronic device (101). Accordingly, the docking station (304) may include a trigger (305) that interacts with a retraction mechanism of the electronic device (101) to retract the outer layer (FIG. 1, 112) and expose the inner layer (FIG. 1, 111) to the cooling system of the docking station (304). For example, as the electronic device (101) is positioned in the docking station (304), the trigger (305) may interact with a corresponding retraction feature of the electronic device (101) to retract the outer layer (FIG. 1, 112) to expose the inner layer (FIG. 1, 111). As the electronic device (101) is removed from the docking station (304), the outer layer (FIG. 1, 112) is re-positioned to enclose the inner layer (FIG. 1, 111) of the electronic device (101). In some examples, the trigger (305) may uniquely interact with the electronic device (101) retraction mechanism so as to prevent unintended exposure of the inner layer (FIG. 1, 111) by the user or another manufacturer.

Figure 4:
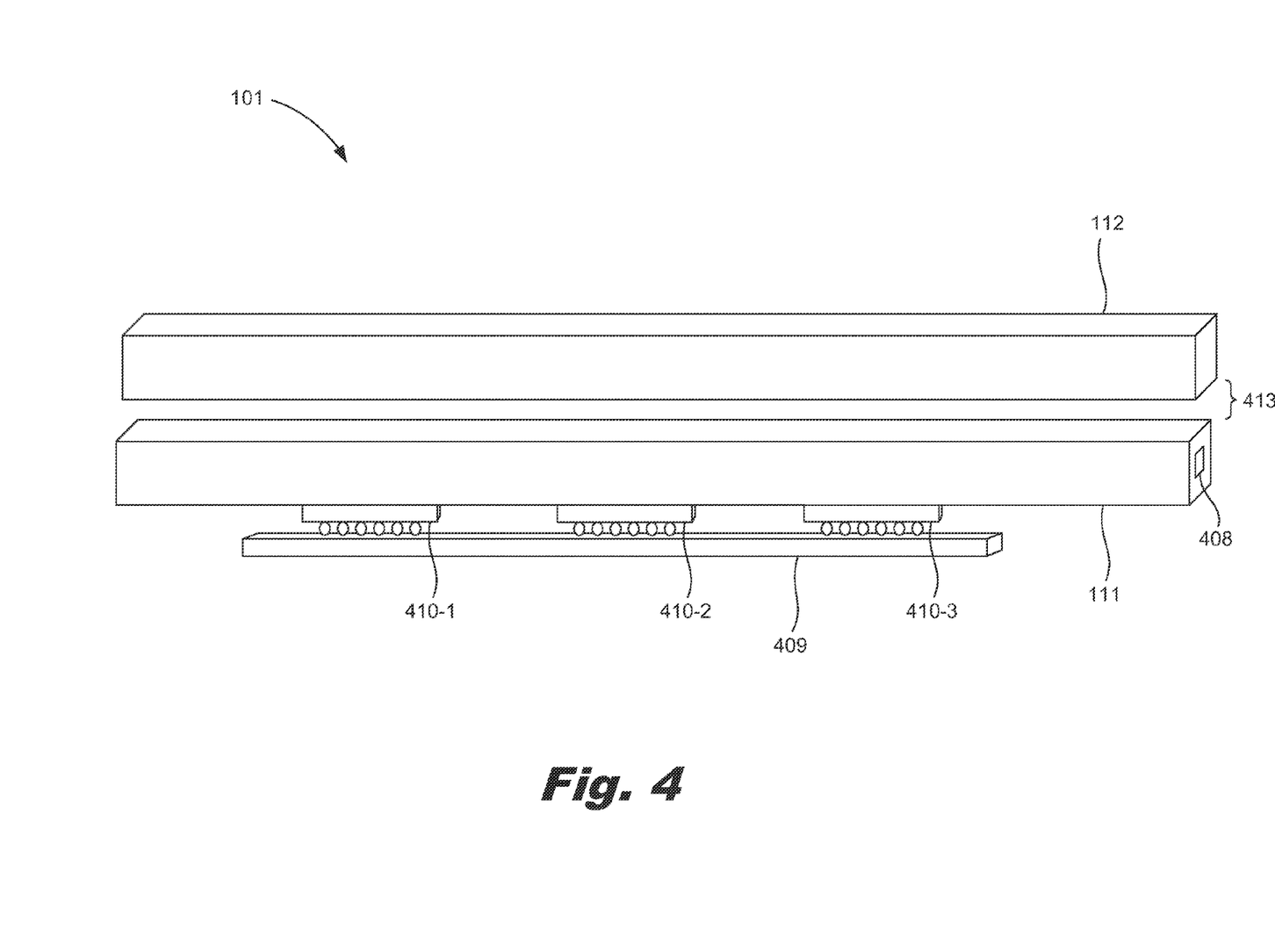
FIG. 4 is a cross-sectional diagram of an electronic device with a multi-layer heat reduction component in a mobile mode, according to one example of the principles described herein.

FIG. 4 is a cross-sectional diagram of an electronic device (101) with a multi-layer heat reduction component in a mobile mode, according to one example of the principles described herein. The cross-sectional view is taken of the area depicted in FIG. 3 by the reference number 307. As depicted in FIG. 4, the electronic device (101) may include a number of integrated circuits (410-1, 410-2, 410-3) or other heat-generating components of the electronic device (101). Examples of integrated circuits (410) include a CPU, a PCH, and a dGPU that are coupled to a printed circuit board (409) of the electronic device (101). These integrated circuits (410) may generate heat when operating. Accordingly, the electronic device (101) may include an inner layer (111) coupled to the integrated circuits (410) to act as a heat sink to remove heat from the integrated circuits (410). In some examples, the inner layer (111) may be formed of metal or any other conducting material.

The electronic device (101) may also include an outer layer (112) that is separated from the inner layer (111) by an air gap (413). As described above, the outer layer (112) may be an outer cover of the electronic device (101) and may be the surface that contacts a user's skin when in use. The outer layer (112) may be formed of metal, plastic or any other structure-providing material. As will be described in connection with FIGS. 5 and 6, the outer layer (112) may be retractable, for example when docked to the docking station (FIG. 3, 304) such that the inner layer (111) is exposed to the cooling system of the docking station (FIG. 3, 304).

The air gap (413) between the outer layer (412) and the inner layer (411) may serve as a thermal insulation of the electronic device (101). In some examples, the air gap (413) may be at least 2 millimeters thick so as to effectively reduce heat transfer between the inner layer (111) and the outer layer (112).

Figure 6:
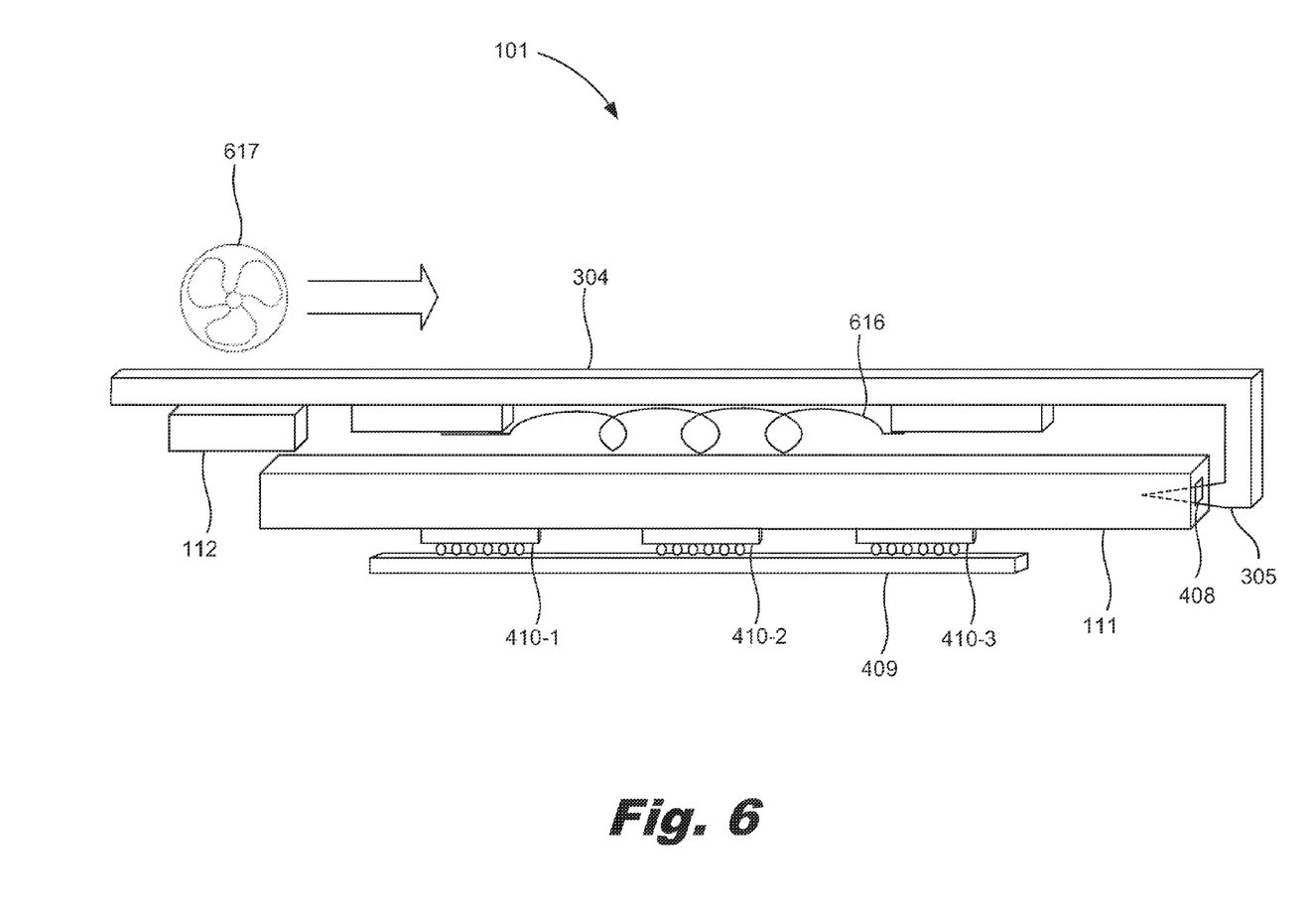
FIG. 6 is a cross-sectional diagram of an electronic device with a multi-layer heat reduction component in a docked mode, according to one example of the principles described herein.

The electronic device (101) may include a retraction feature (408) that, when activated retracts the retractable outer layer (112) of the multi-layer heat reduction component to expose the inner layer (111). In some examples, the retraction feature (408) may be a mechanical feature that mechanically retracts the outer layer (112). An example of a mechanical retraction feature (408) is illustrated in FIG. 6 below. In other examples, the retraction feature (408) may be activated by an electronic signal from a separate electronic device to which the electronic device (101) supplies processing power. For example, a button presented on the interface of the mobile device (FIG. 1, 102) or the second electronic device (FIG. 1, 103) may send an electronic signal to the electronic device (101), which signal directs the electronic device (101) to activate a mechanism to retract the outer layer (112). In this example, the electronic device (101) may have a module, such as a wireless or Bluetooth module, which communicates with the second electronic device (FIG. 1, 103).

Including an air gap (413) between layers (111, 112) of a multi-layer cover may reduce the effects of thermal output from the integrated circuits (410) by creating an insulating air barrier. Accordingly, due to the presence of the air gap (413), increased processing power may be used by a mobile device (FIG. 1, 102) or supplied to the mobile device (FIG. 1, 102) from an electronic device (101) even when in a mobile mode as compared to the mobile device's (FIG. 1, 102) on-board processing power.

Figure 5:
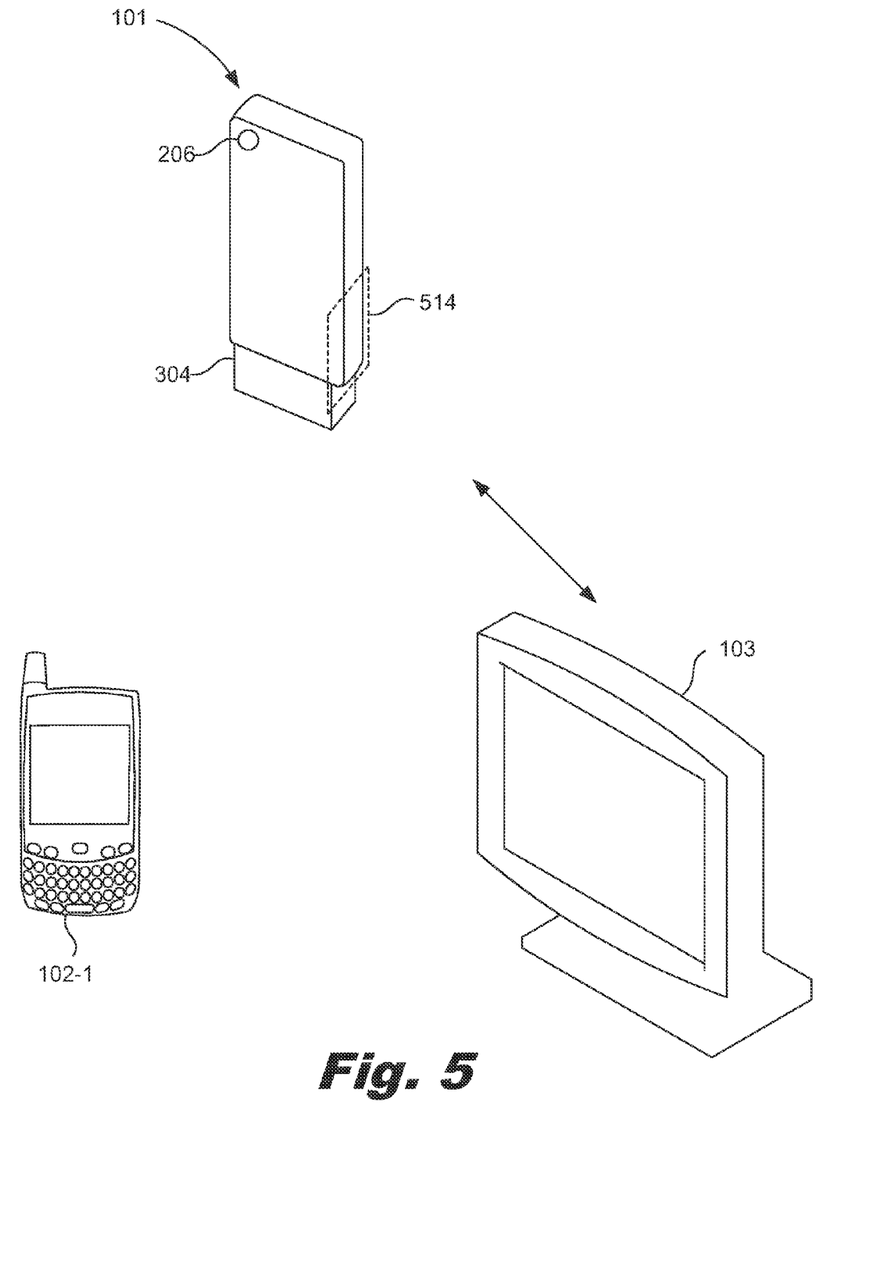
FIG. 5 is a diagram of an electronic device with a multi-layer heat reduction component in a docked mode, according to one example of the principles described herein.

FIG. 5 is a diagram of an electronic device (101) with a multi-layer heat reduction component in a docked mode, according to one example of the principles described herein. As described above, when the electronic device (101) is in a docked mode, it may operate at a higher TDP, such as 35 W, and thus provide a desktop-like operation to either a second electronic device (103) which may not have an independent processor, a mobile device (102), or both simultaneously. Moreover, as demonstrated above in regards to FIG. 3, while FIG. 5 depicts the docking station (304) as being separate from the second electronic device (103), the docking station (304) may be integrally formed in the second electronic device (103). In addition to cooling the electronic device (101), the docking station (304) may instruct the electronic device (101) to operate at a higher power, i.e., a higher TDP, level, thus unlocking more processing power or performance of the electronic device (101).

An electronic device (101) that can operate in either a mobile mode, as depicted in FIG. 3, or in a docked mode, as depicted in FIG. 5 may facilitate providing power to multiple devices (102, 103) while being aware of the operating parameters (i.e., mobile and less cooling available vs. docked and more cooling available) and may supply power to the other devices (102, 103) based on the capabilities of that device. Moreover, in addition to providing processing power to the devices (102, 103), the electronic device (101) may provide a uniform interface, such as a uniform operating system, at each interaction. For example, the electronic device (101) may execute one operating system for the mobile device (102) and may also execute the same operating system for the second electronic device (103).

FIG. 6 is a cross-sectional diagram of an electronic device (101) with a multi-layer heat reduction component in a docked mode, according to one example of the principles described herein. The cross-sectional view is taken of the area depicted in FIG. 5 by the reference number 514. As depicted in FIG. 6, the electronic device (101) may include a number of integrated circuits (410) or other heat-generating components of the electronic device (101). Examples of integrated circuits (410) include a CPU, a PCH, and a dGPU that are coupled to a printed circuit board (409) of the electronic device (101). These integrated circuits (410) may generate heat when operating. Accordingly, the electronic device (101) may include an inner layer (111) to act as a heat sink to remove heat from the integrated circuits (410). In some examples, the inner layer (111) may be formed of metal or any other conducting material.

The electronic device (101) may also include an outer layer (12) that is separated from the inner layer (111) by an air gap (FIG. 4,413). As described above, when docked, the outer layer (112) may be retracted to expose the inner layer (111) to a cooling system of the docking station (304). The retraction may be initiated by a trigger (305) on the docking station (304) that interacts with a retraction feature (408) to slide all, or a portion of an outer cover of the electronic device (101) away from the inner layer (111). As described above, the docking station (304) may be a standalone component or may be integral to an all-in-one shell, display panel or other second electronic device (103).

With the outer layer (112) retracted, the inner layer (11) is exposed to the cooling system of the docking station (304). The cooling system may include liquid cooling coils (616) that are disposed in the docking station (304) and may be disposed adjacent to the exposed inner layer (111). The liquid cooling coils (616) may circulate liquid coolant such as water or other coolant to remove heat from the inner layer (111). The liquid cooling coils (616) may reduce the likelihood of hot-spots, or localized areas of increased thermal output, on the inner layer (111). In some examples, the liquid cooling coils (616) may be embedded in the docking station (304) to prevent replication of the docking station (304).

Furthermore, the cooling system may include a fan (617) to circulate air and further remove heat from the docking station (304) and incorporated liquid cooling coils (616). Including a cooling system in the docking station (304) allows the electronic device (101) to operate at a higher level, by providing additional cooling to the electronic device (101) when docked. Moreover, as the cooling system is included in the docking station (304) as opposed to the electronic device (101) the electronic device (101) may be smaller in size and lighter, thereby enhancing the user experience with the electronic device (101). Moreover, including an active cooling system in the docking station (304) allows the electronic device (101) to deliver a full personal computer performance while managing the thermal output of the electronic device (101).

Figure 7:
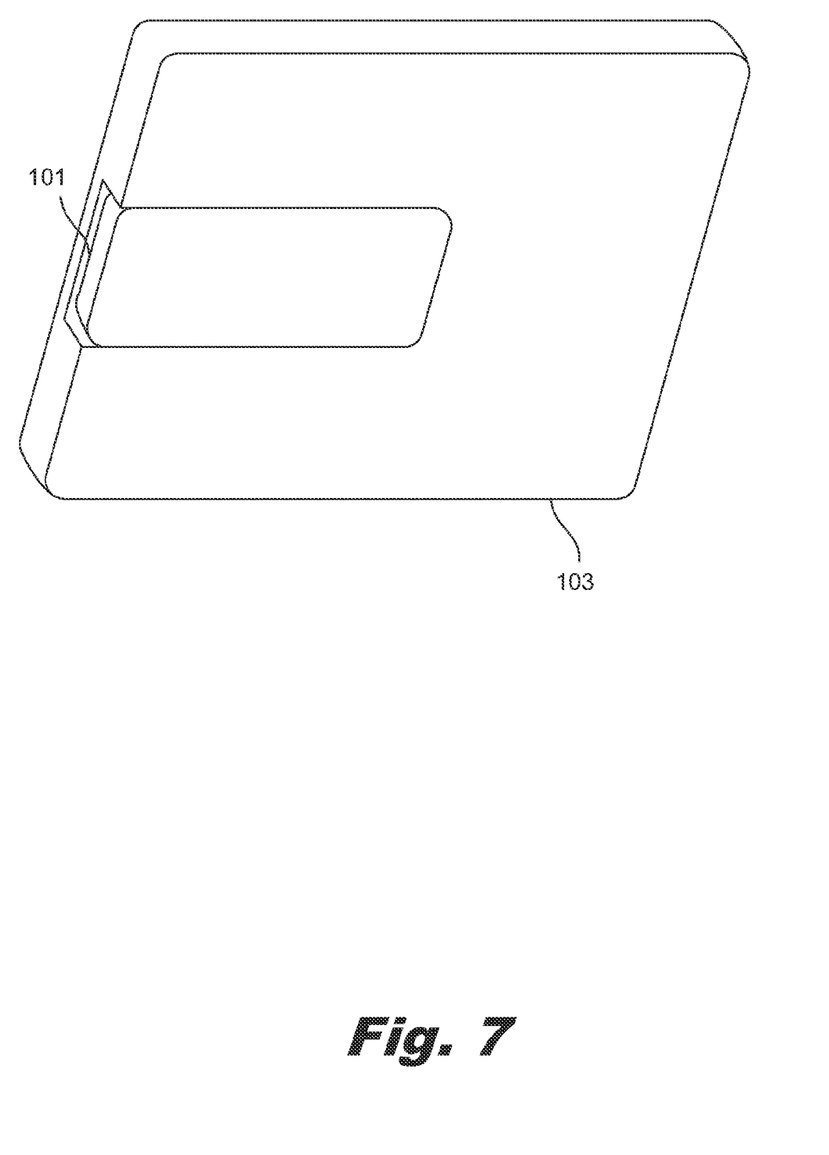
FIG. 7 is a diagram of a system with an electronic device with a multi-layer heat reduction component in a docked mode, according to one example of the principles described herein.

FIG. 7 is a diagram of a system with an electronic device (101) with a multi-layer heat reduction component in a docked mode, according to one example of the principles described herein. As described above, in some examples, the docking station (FIG. 3, 304) may be integrally formed into a second electronic device (103) such as an all-in-one shell or a display panel. In this example, the second electronic device (103) may not have an independent processor and may rely on the electronic device (101) to supply processing capabilities. For example, the second electronic device (103) may simply be a display device such as a computer screen that is activated upon insertion of the electronic device (101) into the screen.

The electronic device (101) as described herein may allow for uniformity of displaying information and of other interactions between a mobile device (FIG. 1, 102) and a separate computing device (103) as it is the electronic device (101) that provides the instructions to present the interface. Moreover, as the electronic device (101) is designed to have a higher TDP processor, the electronic device (101) may supply more power to mobile devices (102), on the order of a full desktop computing performance when in a docked mode, yet also providing increased processing capabilities when in a mobile mode, all while managing, i.e. reducing, the thermal output of the electronic device (101).

Aspects of the present system and devices are described herein with reference diagrams according to examples of the principles described herein.

The preceding description has been presented to illustrate and describe examples of the principles described. This description is not intended to be exhaustive or to limit these principles to any precise form disclosed. Many modifications and variations are possible in light of the above teaching.

What is claimed is:

1. An electronic device with a multi-layer heat reduction component, the device comprising:
    a number of integrated circuits coupled to a printed circuit board (PCB);
    a first layer in contact with the number of integrated circuits to remove heat from the number of integrated circuits;
    a retraction feature to receive a trigger of a docking station; and
    a second layer separated from the first layer by an air gap that is at least 2 millimeters (mm) thick to reduce heat transfer between the first layer and the second layer;
    wherein the second layer is arranged with respect to the first layer such that, responsive to docking with the docking station, a trigger of the docking station interacts with the retraction feature, responsive to which the second layer retracts and receives a liquid cooling coil of a cooling system of the docking station within the air gap and adjacent to the exposed first layer;
    and further wherein the electronic device is to operate in a first mode when docked to the docking station and to operate in a second mode when not docked to the docking station.

2. The electronic device of claim 1, in which the second layer forms at least part of an outer cover of the electronic device.

3. The electronic device of claim 1, in which the electronic device, when in the second mode, provides supplemental processing power to a device.

4. The electronic device of claim 1, in which the electronic device has a 35 watt (W) thermal design power (TDP) processor to provide power to a separate electronic device.

5. The electronic device of claim 1, in which the electronic device is sized to be portable.

6. The electronic device of claim 1, in which:
    when docked, the electronic device operates with a thermal design power of at least 35 watts; and
    when not docked, the electronic device operates with a thermal design power of less than 5 watts.

7. The electronic device of claim 1, wherein the electronic device provides processing power to a mobile device.

8. The electronic device of claim 1, wherein the electronic device provides supplemental processing power to a second electronic device.

9. The electronic device of claim 1, wherein the electronic device provides processing power to both a mobile device and a second electronic device.

10. A system for powering an electronic device having a multi-layer heat reduction component, the system comprising:
    an electronic device to, when in both a mobile mode and a docked mode, provide supplemental processing power to a mobile device, the electronic device comprising:
        a number of integrated circuits coupled to a printed circuit board (PCB);
        a multi-layer heat reduction component comprising a retractable outer layer, an air gap that is at least 2 millimeters (mm) thick, and an inner layer coupled to at least one of the number of integrated circuits, wherein the retractable outer layer, the inner layer, and the air gap are arranged such that the air gap separates the retractable outer layer and the inner layer,
        the multi-layer heat reduction component further comprising a retraction feature to receive a trigger of a docking station, and responsive to an interaction between the trigger and the retraction feature the retractable outer layer is to expose the inner layer to a cooling system of the docking station; and
    the docking station to comprise a cooling system comprising a liquid cooling coil and a fan and responsive to coupling with the electronic device, the docking station is to:
        allow the electronic device to operate in a high power mode; and
        cool the electronic device via the cooling system of the docking station, the cooling system arranged such that the liquid cooling coil is within the air gap and adjacent to the inner layer of the electronic device;
    in which the electronic device is to operate in a low power mode when not docked.

11. The system of claim 10, wherein the electronic device is docked in a display panel.

12. The system of claim 10, wherein the docking station is integral to a second electronic device.

13. An electronic device comprising:
    a number of integrated circuits coupled to a printed circuit board (PCB);
    a multi-layer heat reduction component comprising:

a first layer coupled to at least one of the number of integrated circuits to remove heat from the at least one integrated circuit; and a second layer separated from the first layer by an air gap that is at least 2 millimeters (mm) thick to act as an insulation layer in a lower power mobile mode to reduce a thermal output of the electronic device;

a retraction feature to receive a trigger of a docking station, and wherein the first layer, the second layer, and the retraction feature are arranged such that, responsive to an interaction between the trigger of the docking station and the retraction feature of the multi-layer heat reduction component, the second layer retracts and receives a liquid cooling coil of a cooling system of the docking station within the air gap adjacent to the exposed first layer to actively cool the electronic device through the air gap and the electronic device operates in a higher power docked mode; and a sensor system to:
  indicate when the electronic device is in an enclosed environment; and
  responsive to an indication of an enclosed environment, place the electronic device in a standby mode until an output of the sensor system is de-asserted.

14. The electronic device of claim 13, in which the sensor is a light sensor that detects ambient light.

* * * * *